(12) United States Patent
Groenewegen et al.

(10) Patent No.: US 11,714,613 B2
(45) Date of Patent: Aug. 1, 2023

(54) SURFACING UNDERUTILIZED TOOL FEATURES

(71) Applicant: Microsoft Technology Licensing, LLC, Redmond, WA (US)

(72) Inventors: Peter Groenewegen, Sammamish, WA (US); Arjun Radhakrishna, Seattle, WA (US); Gustavo Araujo Soares, Seattle, WA (US); Mark Alistair Wilson-Thomas, Mercer Island, WA (US); Piyush Arora, Seattle, WA (US); Aaron Chak Hei Yim, Seattle, WA (US); David Ellis Pugh, Bellevue, WA (US); German David Obando Chacon, Kirkland, WA (US); Andrew Richard Sterland, Issaquah, WA (US); Gregory Miskelly, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 17/520,694

(22) Filed: Nov. 7, 2021

(65) Prior Publication Data
US 2023/0141807 A1    May 11, 2023

(51) Int. Cl.
*G06F 9/44*    (2018.01)
*G06F 8/38*    (2018.01)
*G06F 8/33*    (2018.01)

(52) U.S. Cl.
CPC . *G06F 8/38* (2013.01); *G06F 8/33* (2013.01)

(58) Field of Classification Search
None
See application file for complete search history.

(56) References Cited

U.S. PATENT DOCUMENTS

| | | | |
|---|---|---|---|
| 7,260,561 B1 * | 8/2007 | Heidenreich | G06N 5/02 706/45 |
| 11,074,048 B1 | 7/2021 | Wilson-Thomas et al. | |

(Continued)

OTHER PUBLICATIONS

"Refactoring", obtained via <<https://code.visualstudio.com/docs/editor/refactoring>>, Oct. 7, 2021, 7 pages.

(Continued)

*Primary Examiner* — Anna C Deng
(74) *Attorney, Agent, or Firm* — Ogilvie Law Firm

(57) ABSTRACT

Embodiments automate surfacing of underutilized development tool features, thereby enhancing the discoverability of subtools, commands, shortcuts, settings, visualizers, and other tool features. After spotting an inefficiency in the user's interaction with one or more tools, the feature surfacing functionality offers the user an interaction optimization suggestion. A mapping structure correlates detected interaction patterns with objectively better interaction optimizations. Several examples of mappings are discussed. The user can accept a suggestion, have the suggested optimization applied by an enhanced tool, and thereby reduce the number of user gestures utilized to accomplish a desired result, reduce the number of tools utilized, increase security, reduce risk of error, or get to the desired result faster, for example. Interaction optimizations also help the user stay focused, by reducing or avoiding departures from the user's current primary workflow. Other aspects of tool feature surfacing functionality are also described herein.

20 Claims, 4 Drawing Sheets

(56) References Cited

U.S. PATENT DOCUMENTS

| | | | |
|---|---|---|---|
| 2003/0083922 A1* | 5/2003 | Reed | G06Q 10/103 |
| | | | 705/301 |
| 2013/0298018 A1* | 11/2013 | Aqrawi | G06F 11/3438 |
| | | | 715/704 |
| 2021/0034388 A1* | 2/2021 | Granot | G06F 3/0481 |
| 2022/0141318 A1* | 5/2022 | Cannon-Brookes | G06F 9/54 |
| | | | 370/466 |
| 2022/0317979 A1* | 10/2022 | Araujo Soares | G06F 8/33 |

OTHER PUBLICATIONS

"Git experience in Visual Studio", obtained via <<https://docs.microsoft.com/en-us/visualstudio/version-control/git-with-visual-studio?view=vs-2019>>, Sep. 8, 2021, 17 pages.

Nick Babich, "Tips to Improve Discoverability in UX", obtained via <<https://xd.adobe.com/ideas/process/information-architecture/tips-to-improve-discoverability-in-ux/>>, Apr. 14, 2020, 13 pages.

"How to Use Feature Discovery to Improve Product Adoption", obtained via <<https://userpilot.com/blog/improve-feature-discovery-product-adoption/>>, Jul. 29, 2021, 18 pages.

* cited by examiner

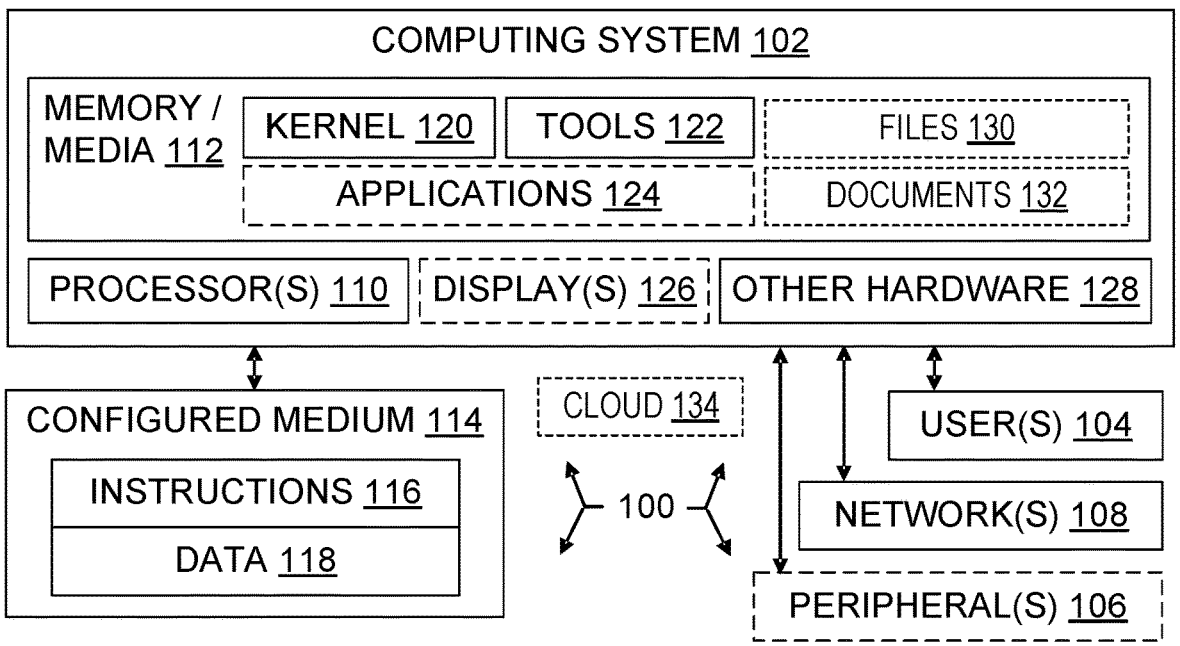
Fig. 1
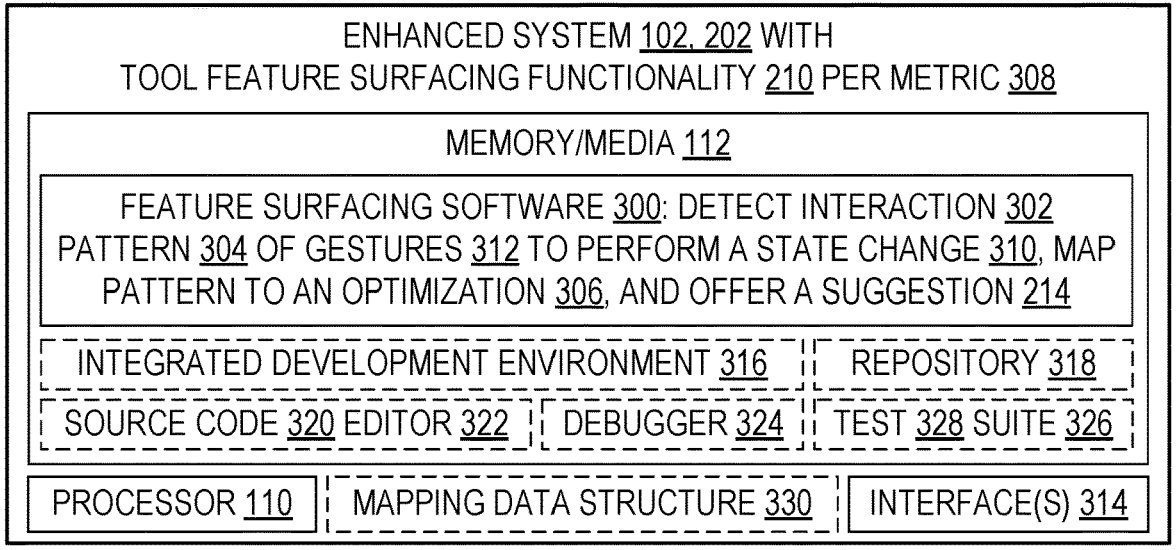
Fig. 2
Fig. 3

SOME ASPECTS OF SOME ENHANCED SYSTEMS 202

| UTILIZED TOOLS COUNT 408 | UTILIZED GESTURES COUNT 410 | SPEED 412 |

| SECURITY 414, E.G., SOURCE CODE SECURITY 424 | RISK 416, E.G., RISK 426 OF AN OMITTED EDIT 428 |

| SOURCE FILE 430 CONTENT 432 | CONTENT DISPLAY FUNCTIONALITY 434 |

BREAKPOINT 436: RUN-TO-CURSOR 438, SINGLE-USE 440, CONDITIONAL 442, NEXT STATEMENT 444, EXCEPTIONS 446 CONTROL 448

| PROCESS 450 | SUBTOOL 402 | VERSION CONTROL TREE 452 BRANCH 454 |
| REGEX 418 | TOOL SETTING 456 | INTERVAL 458 AFTER OPTIMIZATION 306 |
| FULL SET 460 OF GESTURES | TARGET: CONTENT / LOCATION 404 / 406 |
| TOKEN 420 | PARSING 422 | INTERACTION CONTEXT DATA 462 |

Fig. 4

ASPECTS OF SOME EDITING STATE CHANGES 310

| WHITE SPACE 502 | UNUSED CODE 504 | BOOKMARK 514 | COMMENT 506 |
| CURSOR OR INSERTION POSITION 512 | CLEANUP ACTION 510 | STRING 508 |

Fig. 5

SOME ASPECTS OF SOME USER INTERFACES 208

| PRIMARY WORKFLOW 606 | ACTION 618 BUTTON 616 | DIFF VIEW 614 |
| INPUT 608 DEVICE 620 | AMBIENT VISUALIZATION SCREEN REGION 622 |
| VISUALIZER 626 | SUGGESTION PRESENTATION MECHANISM 602 |
| COMMAND 604 | SHORTCUT 610 | WINDOW 612 | UNDO 624 |

Fig. 6

SURFACING UNDERUTILIZED TOOL FEATURES

BACKGROUND

Programs for software development were among the first software tools created, ultimately including editors, version managers, interpreters, compilers, linkers, automated testers, debuggers, and profilers, for example. Tools for hardware development, e.g., for circuit layout or optimization, also exist. Development tools have undergone many changes over time, including many improvements. Some tools accept input not only in the form of characters typed on a keyboard, but also in the form of data sent from a mouse, pen, touch pad, touch screen, microphone, or other device. Some permit a user to define a sequence of keys as a macro, allowing the user to easily repeat a command sequence. Many editors provide a WYSIWYG (what you see is what you get) user experience, so that an appearance of a document onscreen in the editor closely resembles a result of printing the document. Some tools support multiple windows, to assist a user who is working contemporaneously with multiple files or with different parts of a given file, or both. Some tools support integration of graphic images into a document, or provide a user with access to graphics tools within a tool usage session.

The range of "text" operated upon by an editor or debugger, for example, was originally limited mostly to alphabet letters, numbers, and punctuation. But over time, the text one can utilize with a development tool has expanded to include at least mathematical symbols, geometric shapes, music and other notational systems, logographic and syllabic scripts, and many other written symbols. As of the present time, the Unicode® technology standard for encoding, representing, and handling text covers over 150 modern and historic scripts, including over 140,000 characters (mark of Unicode, Inc.).

Some tools are specialized for particular knowledge areas or fields of practice, such as video editing, sound editing, automated program testing, or software source code editing or debugging. In particular, some source code tools provide integrated functionality for syntax checking, autocompletion, indentation, brace matching, and easy access to an editor, compiler, interpreter, or debugger.

Despite these advancements, improvements are still possible in the field of tools for developing software or hardware.

SUMMARY

Some embodiments described herein automate surfacing of underutilized development tool features, thereby enhancing the discoverability of subtools, commands, shortcuts, settings, visualizers, and other tool capabilities that a given user has not fully utilized. After spotting an inefficiency in the user's interaction with one or more tools, the feature surfacing functionality offers an interaction optimization suggestion. The user can accept an offered suggestion, in order to reduce the number of user gestures utilized to accomplish a desired result, reduce the number of tools utilized, increase security, reduce risk of error, or get to the desired result faster, for example. Interaction optimizations also help the user stay focused, by reducing or avoiding departures from the user's current primary workflow. Other aspects of tool feature surfacing functionality are also described herein.

Some embodiments use or provide a hardware and software combination which is configured for improving tool feature discoverability. The embodiment detects a user-tool interaction pattern from a digital representation of interactions between a user and one or more development tools. The pattern includes a set of user gestures which upon execution by a computing system perform at least a portion of a system state change indicated by the user gestures. The embodiment proactively and automatically maps the interaction pattern to an interaction optimization which is applicable to perform the system state change. Then the embodiment configures a user interface of the computing system with a suggestion offering the interaction optimization. The system state change may be performed after the user accepts the suggestion, by applying the offered interaction optimization. By performance of the interaction optimization, operation of the computing system is improved in comparison to not accepting the suggestion, under a performance metric such as the number of user gestures utilized, the number of software tools utilized, the speed with which the desired state change is achieved, cybersecurity, or error avoidance.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 1 is a block diagram illustrating computer systems generally and also illustrating configured storage media generally;

FIG. 2 is a block diagram illustrating aspects of a computing system which has one or more of the tool feature surfacing enhancements taught herein;

FIG. 3 is a block diagram illustrating an enhanced system configured with tool feature surfacing functionality;

FIG. 4 is a block diagram illustrating some additional aspects of some enhanced systems;

FIG. 5 is a block diagram illustrating some aspects of editing state changes which may be accomplished by applying offered generated suggestions;

FIG. 6 is a block diagram illustrating aspects of some user interfaces of development tools;

DETAILED DESCRIPTION

Overview

Figure 7:
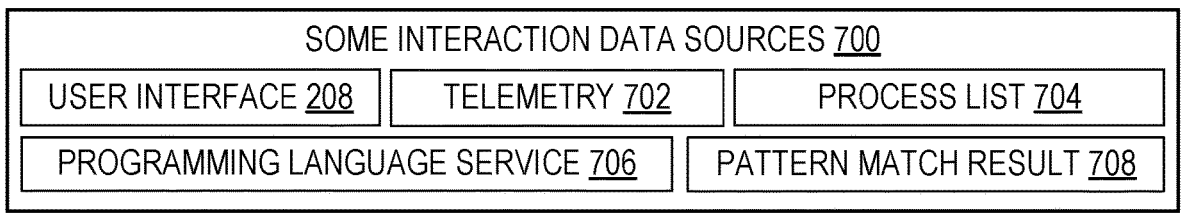
FIG. 7 is a block diagram illustrating some information sources that are suitable for obtaining user-tool interaction data for interaction pattern detection.

Innovations may expand beyond their origins, but understanding an innovation's origins can help one more fully appreciate the innovation. In the present case, some teachings described herein were motivated by Microsoft innovators who recognized and faced technical challenges arising from their efforts to make source code editors and other development tools more effective and easier to use.

The innovators observed that some software developers only use a fraction of the available features of a source code editor. Many useful shortcuts, commands, subtools, and other editor features are never discovered. Some are discovered but underutilized, e.g., they have been used and would probably be useful again for a software developer to complete a task in the editor but are not being used again. Upon reflection, the innovators also concluded that features of development tools other than editors are likewise underutilized.

Accordingly, a set of technical challenges arose, involving the surfacing of underutilized development tool features. One may view these as challenges arising from this initial technical question: How specifically may a development tool facilitate utilization of its features to help users improve their instructions to the tool as they pursue particular results using the tool?

One constituent challenge is to determine how a tool can automatically infer user intent, that is, how can the tool identify the user's desired result? Some embodiments address this challenge using interaction pattern detection.

Another constituent challenge is to determine how the tool can automatically suggest better ways to achieve a given result. Some embodiments address this challenge using a specialized data structure which maps interaction patterns to corresponding interaction optimizations.

Yet another constituent challenge is to determine which particular desired results are well suited to improvements in how the user achieves them. Some embodiments address this challenge by including only interaction optimizations that are "better" under one or more metrics, e.g., reduced gesture count, reduced tool count via context switches, better security, less risk, or faster desired results.

More generally, the present disclosure provides answers to these questions and technical mechanisms to address these challenges, in the form of tool feature surfacing functionalities. The surfacing functionalities may be used in various combinations with one another, or alone, in a given embodiment.

For example, by looking at edit or other tool usage patterns or other interaction data in an abstract syntax tree or a log (e.g., command telemetry), an enhanced tool can find a pattern where an editor command or another feature of an editor could have helped the developer get to the same result as the developer is currently trying to achieve with more gestures (more typing, more mouse clicks, and so on) than necessary. In some cases, a different approach is better in some other way, e.g., more secure or less likely to contain errors. In each case, the enhanced tool can generate a suggestion based on these interaction signals and suggest that the developer use a command or other feature they are not currently using, with the suggestion being made at a moment when the user can apply the suggested feature directly.

For instance, instead of repeating an edit sequence on each of several lines, the user could accept a suggestion to employ a multi-caret editing feature and thereby edit all the lines at the same time. Instead of opening a command line interpreter window and typing repository command invocations, the user could accept a suggestion to utilize repository commands that are built into an integrated development environment. Instead of repeatedly checking the value of a variable inside a loop, the user could accept a suggestion to set a conditional breakpoint in a debugger. Many other examples are given herein, for editors and for other development tools.

Some embodiments perform a feature surfacing method that includes detecting edit patterns or other interaction patterns that are done inefficiently or otherwise non-optimally "by hand" (e.g., using more gestures than necessary) and can be done "automatically" instead (e.g., user fewer gestures). Some embodiments analyze patterns and identify which patterns can be optimized for a user, e.g., using a mapping data structure. Then these embodiments show a hint to the user, inside the user's workflow, suggesting a better way for the user to achieve a goal inferred by the embodiment from the user's recent interactions with the tool(s). "Hint" and "suggestion" are used interchangeably herein. Some embodiments employ a user's acceptance or rejection of the interaction hint as feedback, to continue showing or to stop showing the hint, or other hints, or both.

Accepting generated suggestions can allow developers to do edits and other tasks faster, and more accurately. Surfacing a relevant feature at a point when it can be immediately utilized also helps users learn about tool features, including both relatively new features and those that have been part of a tool for a longer time. Limiting the surfacing to relevant points in the user's interaction with the tool also means the user is interrupted by a suggestion only when the user is likely to consider the surfaced feature something useful that is worth learning. However, surfacing a feature sometime after the pattern has been completed at least once by a user can also be helpful. For instance, an enhanced system may inform a user that several interactions done during a prior session could be done better during the current session.

Particular user-tool interaction patterns and corresponding interaction optimizations, interaction information sources, interaction pattern detection mechanisms, suggestion generation mechanisms, interaction optimization metrics, and other feature surfacing functionalities are described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112, also referred to as computer-readable storage devices 112. Documents 132 and other files 130 may reside in media 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, tool feature surfacing functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

FIG. 2 illustrates a computing system 102 configured by one or more of the tool feature surfacing enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 is discussed further below after an introduction to FIGS. 3 through 7.

FIG. 3 illustrates an enhanced system 202 which is configured with software 300 to provide tool feature surfacing functionality 210. FIG. 3 is also discussed further below after the introduction to FIGS. 4 through 7.

FIG. 4 shows some aspects of some enhanced systems 202. This is not a comprehensive summary of all enhanced system aspects or of every enhanced system 202. These items are discussed at various points herein, and additional details regarding them are provided in the discussion of a List of Reference Numerals later in this disclosure document.

FIG. 5 shows some aspects of some state changes performed by editing a document. This is not a comprehensive summary of all aspects of changes to documents 132 in a given embodiment, or in every embodiment. These items are discussed at various points herein, and additional details regarding them are provided in the discussion of a List of Reference Numerals later in this disclosure document.

FIG. 6 shows some aspects of some user interfaces 208. This is not a comprehensive summary of all user interface aspects, or of every user interface 208. These items are discussed at various points herein, and additional details regarding them are provided in the discussion of a List of Reference Numerals later in this disclosure document.

FIG. 7 shows some aspects of some sources 700 of user-tool interaction context data 462. This is not a comprehensive summary of all sources 700, or of every kind of interaction context data 462. These items are discussed at various points herein, and additional details regarding them are provided in the discussion of a List of Reference Numerals later in this disclosure document.

Returning to FIG. 2, the illustrated system 202 includes a tool 204, which may be, for example, any tool 122 that also has tool feature surfacing functionality 210. A document 132, application 124 component, or other target 226 may be brought from a file 130 into the tool 204 for editing, review, execution, or other operations, in response to input 608 received through a user interface 208. Target content 404 may also be displayed on a screen 126 by operation of the user interface 208. Although for simplicity examples may assume a single file per target, or a single target per interaction optimization, the teachings herein may be applied with multiple files or multiple targets, or both, being involved in a given interaction optimization. The illustrated system 202, and in particular the enhanced development tool 204, is enhanced by the presence and operation of innovative functionality 210 that performs surfacing of tool features 212 to optimize user-tool interactions.

Some tool feature surfacing functionality 210 taught herein includes or uses an automatic suggestion generator 206 which generates interaction suggestions 214. The suggestion generator 206 may include one or more of the following: a transform synthesizer 216 which provides a transform 218, or a library 220 of automatable edit sequences 222 with accompanying transforms 218. Applying a transform 218 changes the target content 404, or changes a copy of a portion of the target content 404, or does both. A copy of a portion of the target content 404 may be transformed to show a user what changes will be made if the transform 218 is applied to the target itself.

Some tool feature surfacing functionality 210 taught herein includes or uses a library 220 of automatable edit sequences 222. A given entry in the library 220 includes an edit graph data structure and one or more corresponding temporal edit patterns (TEPs) 228. When the system 202 matches the edit graph to user inputs, the system may recommend that a corresponding TEP be applied to make changes in the target content 404. The TEP 228 may thus be viewed as a kind of transform 218, which is associated with an edit graph. Other transforms 218 are not necessarily associated with an edit graph.

A temporal edit pattern 228 is a generalization data structure which represents a group of document edits 224, e.g., gestures or their results or both. That is, the TEP 228 may have a coarser granularity than a recording of each edit as it occurred. A TEP 228 may be applied to perform edits at one or more locations 406, with more flexibility than a simple string find-replace operation.

A TEP 228 may contain one or more edit sequence entry points, representing different edit sequences that ultimately accomplish the same changes. For instance, a TEP 228 for removal of a parameter may have a first entry point which removes the parameter from a method's list of arguments and then removes uses of the parameter within the method's body, and also have a second entry point which removes uses of the parameter within the method's body and then removes the parameter from the method's list of arguments.

Edits 224 may be represented using data structures that track edit operation order and also track edit operation location. Edit operation order is temporal data, e.g., timestamps, or sequential numbers, or a list of recent edit operations, or other temporal context. Edit operation location is spatial data, e.g., a filename, a line number from the start of the file, a character position or index from the start of the line, or other cursor position data.

As noted, FIG. 3 illustrates an enhanced system 202 which is configured with software 300 to provide tool feature surfacing functionality 210. For example, software 300 may perform any one or more of the methods illustrated in FIG. 9 (which incorporates FIG. 8). In particular, software 300 may surface a tool feature 212 by obtaining 802 user-tool interaction context data 462, detecting 808 a pattern 304 in the interactions 302, mapping 810 the pattern 304 to an interaction optimization 306, and offering 812 the user a suggestion 214 which identifies a feature 212 that can provide the desired result 310 (inferred from the pattern 304) in a better way.

In some embodiments, mapping 810 the pattern 304 to an interaction optimization 306 is performed by the enhanced system using a mapping data structure 330. One of skill will understand that implementations of mapping data structures 330 may vary across embodiments, but they share the characteristic that each mapping data structure 330 correlates one or more interaction patterns 304 with one or more corresponding interaction optimizations 306. Some mapping 810 examples are listed below, in no particular order.

Comment Conversion Example. Assume a programming language treats text between "//" and the end of the current line as a comment. That is, "//" is a comment delimiter. Assume also that user interactions with an editor are tracked and tokenized, e.g., a down arrow is tokenized into a DownOneLine token 420, and a mouse click that changes the insertion point 512 by moving it down one line is likewise tokenized into a DownOneLine token. Then pattern matching may be performed on tokens that represent interactions, e.g., pattern matching may use a regex 418 or context free grammar parsing 422 to detect a pattern of interaction tokens.

In particular, one detectable pattern 304 includes a sequence of inserting "//" and then moving the text insertion point down one line. A similar detectable pattern includes moving down one line and then inserting "//". Two additional detectable patterns include inserting "//" and moving the text insertion point up one line. A shared goal of these patterns, inferable from their presence, is to make some text be part of a comment 506, on at least one line but possibly on two or more adjacent lines. Accordingly, the four patterns may also be viewed collectively as a single comment-creation pattern which has alternative versions.

This comment-creation pattern may be mapped 810, via a mapping structure 330, to an optimization 306. The mapping structure may include a lookup functionality, implemented for instance using key-value pairs or a table, to computationally look up the interaction optimization (or an identifier thereof) based on the interaction pattern (or an identifier thereof).

Within a suitably equipped and enhanced source code editor 322, 204, the optimization is then offered 812 to the user. Per the optimization, the user can select a multiline block of text using a mouse click and drag, and then convert the entire selected text into comment form using a single command, e.g., Ctrl+K+C in some versions of a Visual Studio® editor (mark of Microsoft Corporation).

More generally, an editor 322 is "suitably equipped" in this example if it has a feature for changing text into comments using fewer gestures than by repeatedly moving the insertion point and inserting the comment delimiter "//". That is, the editor 322 is suitably equipped here because it is able to perform the suggested optimization; it has the surfaced change-to-comment feature 212.

This editor 322 is "enhanced" with surfacing functionality 210 in that the editor has the capability of recognizing a change-to-comment pattern in the user's interactions and offering an interaction optimization that will better achieve the conversion of text to comment form. In this case, "better" means using fewer gestures, and may also be taken to mean with lower risk of an editing error, e.g., by typing "/" instead of "//".

A similar analysis applies to changing text from comment form into non-comment form. Instead of inserting the comment delimiter, the pattern would include removing the comment delimiter. Instead of a command to convert the entire selected text into comment form, the optimization would convert the entire selected text into non-comment form, e.g., by selecting a block of commented text and using Ctrl+K+U in some versions of the Visual Studio® editor.

Conditional Breakpoint Example. Assume a debugger 324 allows a user to set a breakpoint 436 which suspends execution of a program that is being debugged; execution suspends when the breakpoint is encountered. Assume also the debugger can be instructed to display the value of a user-selected variable at the point in program execution where the breakpoint is hit. Assume further that user interactions with the debugger are tracked and tokenized, and that parsing information such as the placement of the breakpoint inside a loop body is part of interaction context data 462.

In this situation, one detectable pattern 304 includes placement of the breakpoint inside the loop body, running to the breakpoint, and the user visually checking the value of the variable by having the debugger display that value. This pattern 304 may be denoted a watch-variable-inside-loop pattern. A slightly extended version of this pattern includes running again to the breakpoint and again displaying the variable's value at that subsequent point in the execution, on the next iteration through the loop. A shared goal of these watch-variable-inside-loop pattern versions, inferred from them, is to reach the point in the program's execution where the variable has a particular value of interest to the developer.

Accordingly, if the debugger has a conditional breakpoint 442 feature 212, and if the debugger is enhanced by suitable surfacing functionality 210, then the enhanced debugger 324, 204 could detect the watch-variable-inside-loop pattern, and map 810 from it to an optimization 306 that sets a conditional breakpoint. The conditional breakpoint will suspend execution only when the watched variable has the particular value of interest. This optimization likely gets program execution to that point faster, and does so with fewer user gestures 312, than the user's non-optimized approach of visually checking the variable at each successive iteration of the loop.

GUID Generation Example. Assume that user interactions with a source code editor 322 are tracked and tokenized, and that parsing information such as the role of a value as a GUID is part of interaction context data 462. A GUID (globally unique ID) can be automatically identified as such in various ways, depending on the specific situation. In some cases, a GUID has a particular syntax, e.g., a certain number of numeric digits followed by a certain alphanumeric string, thus allowing GUID (or likely GUID) recognition using a regex. In some cases, a value is recognized as a GUID because the value is being passed as a parameter or otherwise assigned to a variable which has a declared data type of GUID-type or the like.

In some embodiments, one detectable pattern, denoted here as an editing-GUID pattern, includes recognizing a value as a GUID and then detecting an effort by the user to edit the GUID value. Edits to a GUID are sometimes made by a developer in an effort to quickly generate a different GUID. However, editing a GUID is not recommended, because it is insecure. It results in an often small but nonetheless greater than necessary risk 416 that the supposed GUID resulting from the edits to another GUID will actually not be unique, or will be rejected due to a failed checksum, or will not be managed properly in some other way, e.g., in terms of memory allocation or resource object tracking. Editing a GUID value in an ad hoc manner reduces source code security 424.

A recommended way to obtain a new GUID value is to invoke a system GUID generation routine. Accordingly, some embodiments map 810 an editing-GUID pattern to an optimization that includes inserting a call to the GUID generation routine in place of an ad hoc edited copy of a GUID.

The foregoing examples are illustrative only, not exhaustive. Additional examples of interaction patterns and interaction optimizations, and related software and teachings, are provided at various points of the present disclosure.

In some embodiments, performing the optimizations is uniformly better than performing the corresponding patterns; in some, optimizations are mostly but not always better. What qualifies as a "better" interaction is determined by one or more interaction metrics 308. In some embodiments, one or more of the following metrics 308 is employed: a count 408 of the number of tools 122 utilized to achieve a result 310 (fewer tools being better in many cases, especially if a context switch or other break in developer focus is involved), a count 410 of the number of user-tool interaction gestures 312 utilized to achieve a result 310 (fewer gestures being better), a speed 412 measurement such as the amount of processor cycles or wall clock time elapsed while pursuing an achieved result 310 (faster speed—meaning less time elapsed—being better), a security level 414 while pursuing an achieved result 310 or a security level 414 of the achieved result 310 (more secure being better), or a risk level 416 while pursuing an achieved result 310 or a risk level 416 of the achieved result 310 (less risk being better).

In some embodiments, the enhanced tool 204 may include an otherwise familiar tool 122. In some, it may include a tool 122 not previously well known to the user 104. Or it may include both kinds of tools (as subtools 402). Some examples of tools 122 which may be enhanced according to feature surfacing teachings herein to serve as enhanced tools 204 include integrated development environments 316, repository tools 318, source code 320 editors 322, debuggers 324, and testing tools 326 such as ones that run a suite of tests 328.

In some embodiments, the enhanced system 202 may be networked through an interface 314. An interface 314 may include hardware such as network interface cards, software such as network stacks, APIs, or sockets, combination items such as network connections, or a combination thereof.

In some embodiments, an enhanced system 202 detects 808 a pattern 304 in a particular user's interactions 302 with one or more tools 122, and then finds 810 and suggests 812 an objectively better 308 way 306 for the user 104 to get 816 the same desired result 310. At least one of the tools 122 is enhanced with tool feature surfacing functionality 210; it is allowed but not required that every tool 122 in use by the user be an enhanced tool 204.

In some embodiments, the enhanced system 202, which is configured to improve tool feature discoverability by surfacing features 212, includes a digital memory 112, and a processor 110 in operable communication with the memory. The processor 110 is configured to perform tool feature surfacing 800 steps. As noted elsewhere herein, digital memory 112 may be volatile or nonvolatile or a mix. The steps include (a) detecting 808 a user-tool interaction pattern 304 within a digital representation of interactions 302 between a user 104 and one or more development tools 122, the pattern 304 including a set of user gestures 312 which upon execution by a computing system 102 perform at least a portion of a system state change 310 indicated by the user gestures, (b) proactively and automatically mapping 810 the interaction pattern to an interaction optimization 306 which is applicable to perform the system state without requiring a repetition of the detected pattern, and (c) configuring 814 a user interface 208 of the computing system 102 with a suggestion 214 offering 812 the interaction optimization 306 to at least partially replace 906 or supplement 952 the detected pattern.

One of skill will acknowledge that feature surfacing teachings provided herein may be beneficially embodied in a variety of tools 122, including but not limited to software development tools 122 generally and the specific kinds of tools shown in FIG. 3. One of skill will also acknowledge that surfacing 800 features 212 as taught herein provides objectively measurable improvements, including without limitation improvements in computer system functionality as measured by one or more of the metrics 308.

For example, in some embodiments the enhanced computing system 202 is further characterized in at least one of the following ways.

In some embodiments, the computing system 202 includes an integrated development environment (IDE) software development tool 316, 122, and the optimization 306 is applicable 816 to reduce 920 a count 408 of other software development tools 122 utilized 954 to achieve the system state change 310. For instance, assume the interactions match a pattern that includes opening a window outside the IDE, running a command line interpreter in a shell associated with the window, and typing at least part of a command which has an inferred purpose of invoking a repository tool 318. Such inference could be based, e.g., on a string match between part of a command line typed in the shell and a list of repository tool names. Assume also that the IDE has one or more built-in features for invoking the same repository tool or invoking a functionally similar repository tool. Then the enhanced system could map an external-call-to-repo-tools pattern to an optimization that surfaces the built-in repository tool feature.

For instance, a surfaced built-in repository tool feature 212 could use fewer gestures to switch branches 454 (e.g., rename branch), commit (e.g., push), and then pull (e.g., create pull request), in order to produce 926 a new branch that allows further development without risking loss of prior work. Upon detecting the branch switch in the shell, an enhanced tool such as an enhanced IDE 204 could offer a suggestion to use a built-in feature 212 that performs the same repository command sequence without requiring explicit gestures specifically for the commit and the pull.

Using the built-in repository tool feature saves the user time by providing better speed 412. Use of the built-in repository tool feature may also reduce the risk 416 of a typing error. Use of the built-in repository tool feature may also improve security 414, e.g., if the communications between the IDE and a remote repository are more secure than communications generally between shells and the remote repository.

In some embodiments, the computing system 202 includes a debugger development tool 324, 122, and the optimization 306 is applicable 816 to reduce 922 a count 410 of user interaction gestures 312 utilized 908 to achieve the system state change 310. For instance, if a user keeps checking a variable value on multiple loops, the optimization could set 916 a conditional breakpoint 442; this example is also discussed in more detail above.

As another example involving a debugger 324, assume the detected pattern includes the user commanding the debugger to add a breakpoint 436, then clicking on a continue command to continue execution of the program that is being debugged, and then commanding the debugger to remove the breakpoint that was just added. Then the optimization suggestion 214 could show the user a run-to-the-cursor breakpoint 438 feature 212 whose use will reduce gestures 312 and get the debugger and the debugged program more quickly to the desired state 310 than repetition of the add-continue-remove cycle of the user's pattern.

As yet another example involving a debugger 324, assume the detected pattern includes the user commanding the debugger to add breakpoints 436 at the start and end of a particular routine or other piece of code, setting exception 446 controls 448 at that code's start to enable or disable particular exceptions, and setting the exception 446 controls 448 differently at the code's end. Then the optimization suggestion 214 could show the user an exception-control feature 212 whose use will control which exceptions are caught for a user-specified piece of code. The code could be specified, e.g., by mouse click and drag, by line numbers, or by a routine's name. Corresponding breakpoints and exception settings could then be done automatically by the feature, thereby reducing gestures 312 and getting the debugger and the debugged program more quickly to the desired state 310 than by repeating the user's pattern of gestures.

As an additional example involving a debugger 324, assume the detected pattern includes the user navigating through a sequence of menus to attach a debugger to a process 450 after the process reaches a particular point in its execution. Attaching the debugger sooner is undesirable, because the process will run more slowly with the debugger attached. Then the interaction optimization suggestion 214 could show the user an attach-debugger-at-point feature 212 whose use will add a breakpoint 436 at the particular point in process execution, such as a single-use breakpoint 440 with associated commands to navigate automatically through the menus (or invoke their system call equivalents) and attach 918 the debugger to the process. This optimization reduces gestures 312 and gets the debugger and the debugged process more quickly to the desired state 310 than by repeating the user's pattern of gestures.

In some embodiments, the computing system 202 includes a repository development tool, and the optimization is applicable to reduce a count of user interaction gestures utilized to achieve the system state change. An example is discussed above in the case where an IDE has a surfaced feature that uses a single command (or at least fewer command gestures) to switch branch, commit, push, and create a pull request. However, a similar feature could also reside in an enhanced repository development tool 318, 204, regardless of whether an IDE is also present.

In some embodiments, the computing system 202 includes a testing suite 326 development tool 204, and the optimization is applicable to reduce a count of user interaction gestures utilized to achieve the system state change corresponding to running 928 the tests. For example, the interaction pattern could include repeatedly running a piece of code the user recently edited to test it. Recency could be defined as being within a threshold period of time, or within a threshold number of user gestures, for example. The optimization could offer a feature that tracks which unit tests 328 were run against a recently edited piece of code, and bundling them for convenience into a single test suite 326. The optimization could also then allow execution of that test suite in response to a single testing command instead of the multiple commands otherwise used to invoke the suite's tests individually. Alternately or in addition, the optimization could include a feature to repeat the most recent test.

In some embodiments, the computing system 202 includes a source code editor software development tool 322, 204, and the optimization 306 is applicable to reduce a count of user interaction gestures utilized to achieve the system state change. For example, the interaction pattern could include making the same change on multiple adjacent lines, with the suggested optimization including use of a multi-caret editor subtool 402. When the pattern includes making text into comments (or uncommenting text), the comment conversion feature discussed above may be offered 812 instead of the multi-caret editor.

When an editor interaction pattern includes scrolling back and forth between two positions in a displayed file, or switching back and forth between two files contained in respective windows, a diff view 614 feature, a split view feature, or a side-by-side view content display 434 feature 212 may be offered 812. A bookmark 514 feature may be offered 812 in addition, or instead, when the user is scrolling to each of two positions within a single file, or in a variation, scrolling to fewer than a threshold such as eight positions within a single file.

In some embodiments, the computing system 202 includes a source code editor software development tool 322, 204, and the optimization 306 is applicable to increase the security 424 of source code while achieving the system state change. An example is discussed above in connection with user efforts to edit a GUID value. Another example is a pattern that includes hard-coding keys or secrets into source code, which could offer a feature 212 that analyzes source code for potential security problems. Another example is a pattern that includes bidirectional Unicode® text.

In some embodiments, the computing system 202 includes a source code editor software development tool 322, 204, and the optimization 306 is applicable to reduce a risk 416, 426 of the user inadvertently omitting 428 an edit while achieving the system state change 310. For example, the detected pattern may include edits to remove unused code, such as code to include a namespace or a library which is not actually relied on, unused local variables, or unused parameters. Parser information indicating that certain code is unused may be combined with edit gestures indicating removal of that code, to serve as interaction context data 462 in a remove-unused-code pattern. A corresponding suggestion may offer 812 a code cleanup action 510 feature which is configured to locate and remove instances of various kinds of unused code 504.

In some tools 204, a code cleanup action feature may also format code, e.g., tabs versus spaces, brackets on same line or next line, and so on. In some, the code cleanup action feature performs formatting but does not perform unused code removal. Such a code cleanup action feature may be offered 812 as an optimization 306 after the tool 204 detects a pattern of individual source code formatting gestures.

In some tools 204, formatting is not limited to cleanup, which typically occurs shortly before a file is closed. A file-wide or even project-wide formatting feature 212 may be offered 812 by a tool 204 in response to a pattern 304 that includes formatting gestures at one or more individual locations in a file 130.

One of skill will acknowledge that a wide variety of system state changes 310 can be accomplished in a better way when a user accepts an offered interaction optimization 306, depending on the specific pattern 304 and specific optimization 306 involved. A few of the many examples of state changes 310 include file 130 edits, repo branch 454 creation, debugger 324 settings, and test 328 results.

In some embodiments, the optimization 306 is applied 816 to perform the system state change, and the computing system is further characterized in at least one of the following ways.

In some embodiments, the computing system includes a source code editor 322 software development tool 204 and a source code 320 file 130, and the system state change 310 from optimization application includes changing a content of the source code file. Several examples of such editing state changes are discussed elsewhere herein, involving commenting or uncommenting code, multi-caret editing, removing unused using statements or other unused code, code cleanup, code formatting, and generating a GUID safely.

In some embodiments, the computing system includes a content display functionality 434 of a development tool development tool 204, and the system state change 310 from optimization application includes displaying 914 a content 404 by using the content display functionality. Several examples of such state changes are discussed elsewhere herein, involving comparison in a diff view 614, bookmarks 514, and side-by-side views or split views. Another example includes adding a variable to a watch pane in a debugger, which may occur, e.g., in conjunction with a conditional breakpoint 442 feature 212, a run-to-cursor breakpoint 438 feature, a single-use breakpoint 440 feature 212, or a set next statement 444 feature 212.

As to the set next statement 444 feature 212, an embodiment may detect a pattern in which a user repeatedly stops execution of a program being debugged after execution reaches a point corresponding to a certain line of source code. The embodiment may then suggest use of the set next statement 444 feature 212. Similarly, if a pattern includes a user re-launching a debug session for a particular program under development, the embodiment may suggest use of the set next statement 444 feature 212 to help a user get safely past a problematic point in the execution.

Another example involving content display functionality 434 includes a pattern 304 in which a user repeatedly drills in to see values of properties within properties. An offered optimization may surface a visualizer 626 feature, thereby facilitating a reduction in the number of gestures otherwise utilized to reach the values of interest within a hierarchy of objects, and to then display those values.

In some embodiments, the computing system includes a debugger 324 software development tool 204 and a source code 320 file 130, and the system state change 310 from optimization application includes setting a debugger breakpoint 436 in the source code file. Examples noted elsewhere herein include setting a conditional breakpoint 442, setting a run-to-cursor breakpoint 438, setting a single-use breakpoint 440, or setting a next statement 444.

In some embodiments, the computing system includes a debugger 324 as a development tool 204, and the system state change 310 from optimization application includes attaching the debugger to a process 450 as noted elsewhere herein. Reattaching and initially attaching are each a kind of "attaching" herein.

As discussed at various points herein, in some embodiments the computing system includes a mapping data structure 330 residing in the memory 112. Mapping 810 the interaction pattern 304 to the interaction optimization 306 includes reading 934 the mapping data structure, e.g., to match a correct pattern and to find a corresponding optimization.

In some embodiments, the mapping data structure maps multiple interaction patterns 304 to the same interaction optimization 306. This may occur when different gesture sequences express the same goal, e.g., interactions by a user who is unfamiliar with a feature that comments a block of code could show a top-down pattern of commenting the block line-by-line from the top down, or show a bottom-up pattern of commenting the block line-by-line from the bottom up. Both the top-down pattern and the bottom-up pattern could be mapped to the same comment-block-of-code feature. As another example, a pattern of removing individual unused code items and a different pattern of formatting individual code items could each be mapped to a code cleanup feature.

Although many of the examples herein involve source code 320, one of skill will acknowledge that many of the teachings provided herein can be applied as well to target content 404 which is not source code. In particular, a variety of documents 132 are relevant, in that many tool features 212 are not limited to use in source code. For instance, bookmarks 514 may be set in documents 132 that do not contain any source code, or in non-source-code portions of documents that contain both source code and non-source-code text (natural language prose, poetry, spreadsheet data, etc.).

One of skill will acknowledge that the user edits 224 which are given to the suggestion generator 206 could match a known pattern 228, 304, such as a known refactoring pattern, or they might not match any available pattern 228. If they don't match any known pattern then the edits can still be fed to a PROSE synthesizer or a CODEX code synthesis engine or a similar transform synthesizer 216 serving as a suggestion generator 206 as a catch-all pattern 304, with the suggestion generator 206 serving in this case as a mapping structure 330.

Other system embodiments are also described herein, either directly or derivable as system versions of described processes or configured media, duly informed by the extensive discussion herein of computing hardware.

Although specific tool feature surfacing architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, aspects, mechanisms, operational sequences, data structures, or other functionalities for instance, and may otherwise depart from the examples provided herein.

Processes (a.k.a. Methods)

Figure 8:
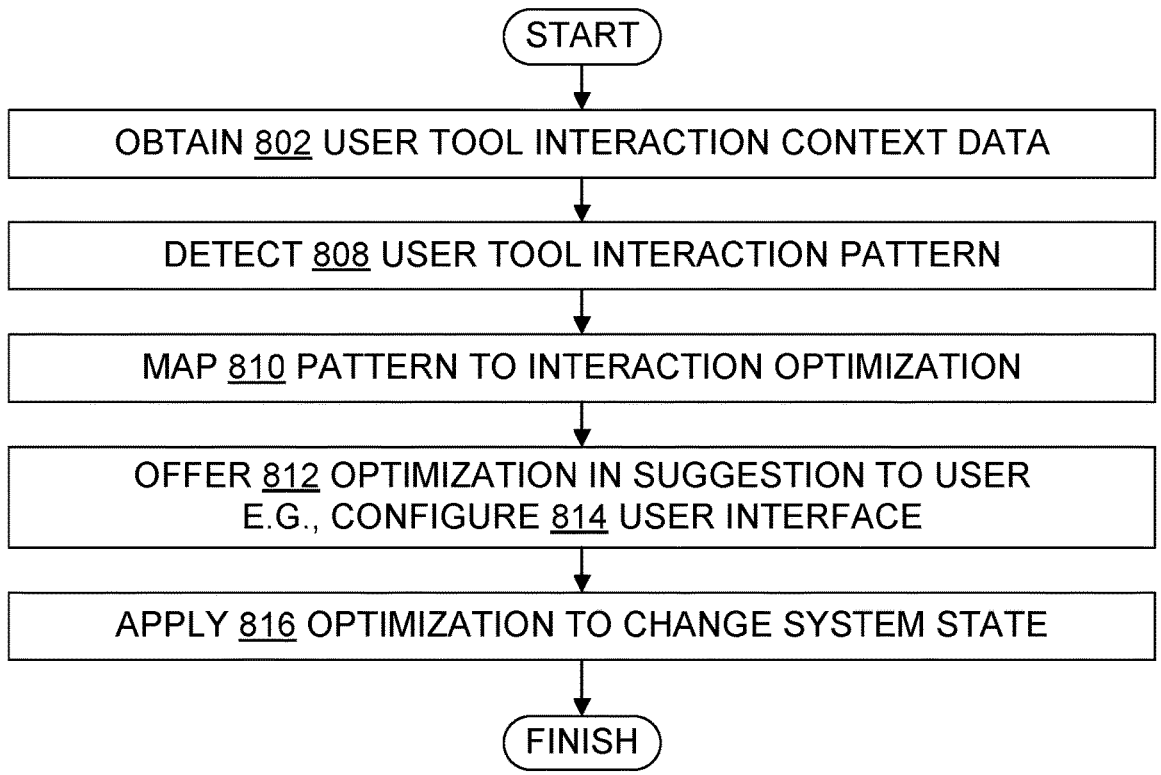
FIG. 8 is a flowchart illustrating steps in some tool feature surfacing methods.
Figure 9:
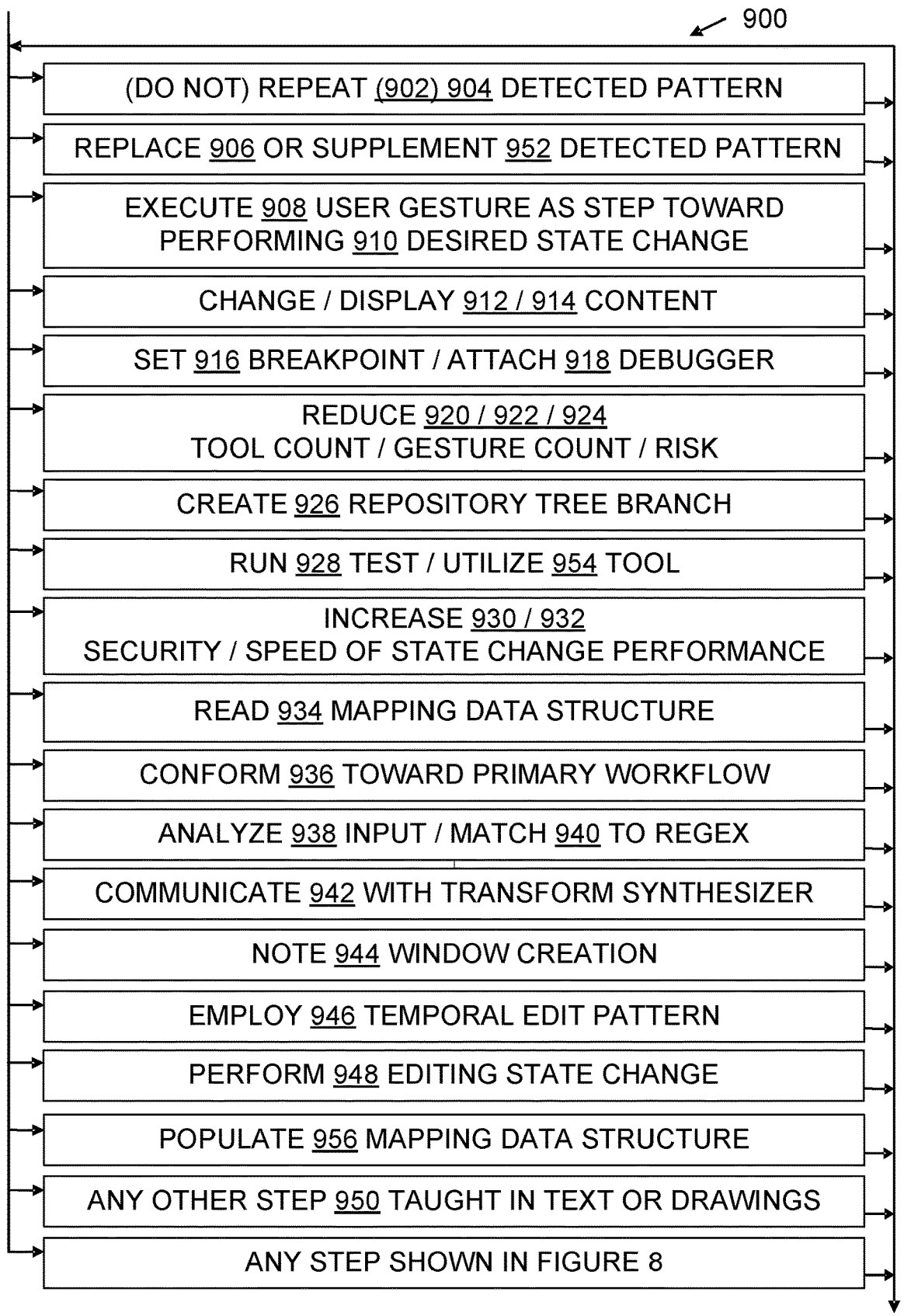
FIG. 9 is a flowchart further illustrating steps in some tool feature surfacing methods, incorporating FIG. 8.

FIGS. 8 and 9 illustrate families of methods 800, 900 (which may also be referred to as "processes" in the legal sense of that word) that may be performed or assisted by an enhanced system, such as system 202 or another tool feature surfacing functionality 210 enhanced system as taught herein. FIG. 9 includes some refinements, supplements, or contextual actions for steps shown in FIG. 8, and incorporates the steps of FIG. 8 as options.

Technical processes shown in the Figures or otherwise disclosed will be performed automatically, e.g., by an enhanced tool 204, a feature 212, or a transform provider 206, unless otherwise indicated. Related processes may also be performed in part automatically and in part manually to the extent action by a human person is implicated, e.g., in some embodiments a human may manually indicate acceptance of a recommendation and thereby trigger application 816 of the recommendation 214, but no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which flowchart 800 or 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments detect 808 a pattern 304 from as few as one interaction, and so might detect a pattern before the user has completed a full set of interactions even once. Thus, the embodiment is said to "supplement" the pattern with the optimization. In some cases, however, the user has performed a full set of patterns and the inefficiency or security risk is that the user will repeat the pattern. In these cases, the embodiment is said to "replace" the pattern with the optimization. In either case, whether the optimization supplements the pattern or replaces a repetition of the pattern, applying 816 the suggested optimization will get the state change the user intended, will to do that in a better way than the way previously attempted by the user.

Some embodiments use or provide a method 900 for improving tool feature discoverability, the method performed by a computing system 202, the method including: detecting 808 a user-tool interaction pattern 304 from a digital representation of interactions 302 between a user 104 and one or more development tools 122, the pattern including a set of user gestures 312 which upon execution by the computing system perform at least a portion of a system state change 310 indicated by the user gestures; proactively and automatically mapping 810 the interaction pattern to an interaction optimization 306 which is applicable to perform the system state change; configuring 814 a user interface 208 of the computing system with a suggestion 214 offering 812 the interaction optimization; and performing the system state change by applying 816 the offered interaction optimization.

In view of teachings herein, one of skill will acknowledge that some UI mechanisms 602 are more intrusive upon a developer's current workflow 606 than other UI mechanisms. For example, requiring that a developer open another window 612 and do a keyword search to locate potentially useful subtools 402 is much more intrusive than recommending 812 a particular refactoring subtool 402 from a library 220 be applied. An advantage of many of the suggestions 214 offered to the user is that they interrupt the user's workflow less. Some examples include using repo tools 318 inside a Visual Studio® IDE 204 instead of switching over to a command line interpreter, offering 812 a side-by-side or split screen to reduce scrolling, and easily reattaching a process 450 instead of walking through many gestures to do that.

In some embodiments, the interactions 302 between the user and one or more development tools have a primary workflow 606, and applying 816 the interaction optimization conforms 936 more closely to the primary workflow than the detected 808 user-tool interaction pattern.

In some embodiments, applying 816 the optimization stays 936 within a current workflow 606 in at least one of the following ways: by avoiding switching between input devices 620 while receiving a user input which accepts, rejects, or modifies a displayed recommendation (e.g., not switching between mouse and keyboard); avoiding requesting checklist constraints from the user (e.g., no need to fill in a checklist or select multiple criteria); avoiding context switches; avoiding displaying the recommendation 214 outside of an ambient visualization screen region 622 of the user interface (e.g., avoid recommendations in popups or separate windows but allow them in completion lists and diff views); or using acceptable in-flow adornments such as diff view or refactoring annotation or pop-up instead of flow-breaking adornments such as a light bulb or a separate window or file or a dialog box. One advantage of staying in a workflow is that the traditional functionalities within the flow remain available, e.g., source code formatting is available in-flow in some IDEs but not available in a separate window or other out-of-flow context.

One of skill will acknowledge that a less desirable user interaction pattern 304 may be detected 808 in various ways, consistent with the teachings herein. In some embodiments, detecting 808 the user-tool interaction pattern includes at least one of the following: analyzing 938 keyboard input 608; matching 940 user gestures 312 (e.g., as characters or events or other tokens) to a regular expression 418; communicating 942 with a transform synthesizer 216; noting 944 creation or use of more than one user interface window (e.g., for a command line interpreter); or employing 946 a temporal edit pattern 228.

In some situations, a user learns about a feature 212 from a suggestion 214 and then makes use of the feature later on their own. "Later" is defined for this purpose by an interval 458 between (i) learning about the feature from the suggestion and then (ii) using the feature again without another suggestion. In some embodiments, an interval 458 elapses after performing the system state change by applying 816 the interaction optimization which was offered in the suggestion, and the method further includes applying 816 the interaction optimization again after the interval has elapsed and without any additional proactive suggestion 214 from the computing system 202 which offers the interaction optimization. In some of these embodiments, the interval is characterized by at least one of the following: an interval duration of at least ten minutes; or entry of at least one hundred user gestures into the computing system during the interval.

One of skill will acknowledge that gains from applying a surfaced 800 feature may vary between embodiments and between situations. However, one of skill will also acknowledge the possibility, or even the likelihood, of some "big win" situations in which the number of user gestures is cut in half (or even more) by applying the offered suggestion. It is contemplated that big win situations are likely to include one or more of the following editing situations: reformatting white space 502, e.g., moving "{" to the same line as the "if" or to the next line, per a style guide; removing unused code, e.g., unused using statements; altering comment content, e.g., teaching the user about Ctrl+K+C and Ctrl+K+U to comment or uncomment code; applying a synthesized transform, e.g., refactoring; replacing a string 508 by another string, e.g., via a find-replace feature which generates a transform based on examples of desired results; conducting a source code cleanup action, e.g., adding a blank line at the end of a file, and removing unused usings and other unused code; or repositioning a cursor in a file being edited, e.g., scrolling back and forth.

More generally, in some embodiments the computing system 202 includes an editor as a development tool, and a set of user gestures which performed the system state change without applying the interaction optimization includes N user gestures. The offered interaction optimization includes no more than N/2 user gestures and also performed the system state change. In some of these embodiments, the system state change 310 includes at least one of the following: reformatting white space, removing unused code, altering comment content, applying a synthesized transform, replacing a string by another string, conducting a source code cleanup action, or repositioning a cursor in a file being edited.

In some big win situations, a risk 416 of accidentally missing a location 406 to operate on is reduced by applying 816 the offered suggestion instead of continuing to do operations manually at each location. The more locations there are that would benefit from an operation, and the more scattered they are, the more likely it is that manual operations will miss one or more of them. For example: a source code file in an editor may have multiple locations where the same refactoring edit should be made; a program in a debugger may have multiple locations where the same conditional breakpoint should be set, or multiple locations where the same exception settings should be set in a breakpoint; a directory tree traversal script may indicate multiple locations where the same file renaming operation should be done; and so on.

More generally, in some embodiments the computing system includes a target content 404 operable on by at least one development tool 122. A set of user gestures which performed the system state change without applying the interaction optimization operated on the target content at a first target location 406 in the target content, and the offered interaction optimization 306 operated to perform the system state change in the target content in at least five additional target locations. Thus, the risk 416 of missing one of the at least five additional target locations is avoided by applying the suggested optimization. More generally, a suggested feature 212 may be offered to fix or update text at all similar locations after a pattern of fixing or updating text at one location is detected.

In some situations, an embodiment can determine what the user is trying to do and suggest a better way to do that even before the user finishes doing it the first time. For example, the embodiment may detect the user starting to work through a set of menus to attach the debugger 324 to a process and proactively suggest reattaching the same process(es) as last time, even before the user has reached a list of running processes. As another example, the embodiment may detect the user opening a command interpreter window and typing "git", and then proactively suggest using the built-in Visual Studio® git tools, even before the user has finished typing the command line parameters for the git command (mark of Microsoft Corporation).

More generally, in some embodiments detecting 808 the user-tool interaction pattern, mapping 810 the interaction pattern to the interaction optimization, and configuring 814 the user interface of the computing system with the suggestion offering the interaction optimization each occur before the user interface receives a full set 460 of user gestures. A full set 460 is a set which upon execution by the computing system would fully perform the system state change.

In some situations, the user has not previously used the surfaced feature. In some embodiments, configuring the user interface with the suggestion includes suggesting to the user at least one of the following: a development tool 204 subtool 402 which has not previously been used by the user in the computing system; a development tool command 604 which has not previously been used by the user in the computing system; a development tool keyboard shortcut 610 which has not previously been used by the user in the computing system; or a development tool setting 456 which has not previously been used by the user in the computing system.

Interaction context data 462 usable for detection of user interaction patterns may be obtained from various sources 700. In some embodiments, detecting 808 a user-tool interaction pattern includes obtaining 802 interaction context data from at least one of the following: a development tool user interface 208 (e.g., for keyboard activity); a development tool telemetry 702 source (e.g., to find out what process the debugger attached to last time, or what unit tests were run last time); a list 704 of processes 450 running on the computing system (e.g., to spot a command interpreter window or shell); or a programming language service 706 (e.g., to correlate edit gestures with unused code).

One of skill informed by the teachings herein will acknowledge various technical advantages of applying a suggested optimization instead of doing without it. In some embodiments, performing the system state change by applying the offered interaction optimization performs the system state change with a reduction in a user interaction gesture count compared to a hypothetical alternative of utilizing the user-tool interaction pattern in place of the interaction optimization. In some, performing the system state change by applying the offered interaction optimization performs the system state change with a reduction in how many development tools are used compared to a hypothetical alternative of utilizing the user-tool interaction pattern in place of the interaction optimization. In some, performing the system state change by applying the offered interaction optimization performs the system state change faster than a hypothetical alternative of utilizing the user-tool interaction pattern in place of the interaction optimization. In some, performing the system state change by applying the offered interaction optimization performs the system state change with an increase in source code security compared to a hypothetical alternative of utilizing the user-tool interaction pattern in place of the interaction optimization.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as interaction gesture data structures 312, interaction optimization data structures 306, mapping data structures (data and instructions) 330, temporal edit patterns 228, transforms 218, libraries 220, interaction context data 462, suggestions 214, or tool feature surfacing software 300, in the form of data 118 and instructions 116, read from a removable storage medium 114 and/or another source such as a network connection, to form a configured storage medium. The configured storage medium 112 is capable of causing a computer system 102 to perform technical process steps for tool feature surfacing, as disclosed herein. The Figures thus help illustrate configured storage media embodiments and process (a.k.a. method) embodiments, as well as system and process embodiments. In particular, any of the process steps illustrated in FIG. 8 or 9, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a tool feature discovery method. This method includes: detecting 808 a user-tool interaction pattern from a digital representation of interactions between a user and one or more software development tools, the pattern including a set of user gestures which upon execution by the computing system perform at least a portion of a system state change indicated by the user gestures; proactively and automatically mapping 810 the interaction pattern to an interaction optimization which is applicable to perform the system state change; configuring 814 a user interface of the computing system with a suggestion offering the interaction optimization; and performing the system state change by applying 816 the offered interaction optimization.

In some embodiments, mapping 810 the interaction pattern to the interaction optimization includes populating 956 a mapping data structure using a pattern matching result 708 of a code synthesis pattern matching algorithm. For instance, code synthesis pattern matching information from a PROSE synthesizer 216 may be part of a mapping data structure 330.

In some situations, an advantage of the embodiment is time saved between knowing about a feature (e.g., conditional breakpoints) and then remembering to use them. That is, time is saved by using the feature at a first or early relevant point in the workflow instead of not using the feature until some later point. With regard to debuggers, for example, considerable user time can be saved by use of conditional breakpoints and other underutilized features when debugging a program. In some embodiments, the interaction optimization offered in the suggestion includes setting a conditional breakpoint. In some, the interaction optimization offered in the suggestion includes changing a content of a source code file. In some, the interaction optimization offered in the suggestion identifies a content display functionality 434, e.g., a diff view, visualizer, bookmark, side-by-side view, split view, or a watch pane in a debugger.

Additional Observations

Additional support for the discussion of tool feature surfacing herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, additional examples and observations are offered.

Technical Character

The technical character of embodiments described herein will be apparent to one of ordinary skill in the art, and will also be apparent in several ways to a wide range of attentive readers. Some embodiments address technical activities such as executing feature surfacing software 300, communicating 942 with a suggestion generator 206, and applying 816 interaction optimizations in a software tool 204, which are each an activity deeply rooted in computing technology. Some of the technical mechanisms discussed include, e.g., pattern-to-optimization mapping data structures 330, temporal edit patterns 228, tool features 212, and suggestion generators 206. Some of the technical effects discussed include, e.g., enhanced discoverability of available tool features 212 generally and in mitigation of late awareness in particular, enhanced discovery of similar locations 406 to which a transform or other feature may apply (even to the extent of sharing locations or a location-identifying pattern across a team or across a project or codebase), improved user satisfaction and productivity from staying 936 within a workflow during development, faster and more accurate editing, reduced 922 gestures to achieve a state change 310, reduced 920 tool count to achieve a state change 310, improved security 414, and reduced omission risk 416. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as availability, awareness, ease, efficiency, or user satisfaction, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively utilize tool features 212 that are difficult for users to discover manually. Other configured storage media, systems, and processes involving availability, awareness, ease, efficiency, or user satisfaction are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, time period examples, software processes, security tools, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit GUI: graphical user interface
GUID: globally unique identifier
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Tool feature surfacing operations such as applying 816 optimizations, communicating 942 with a suggestion generator 206, populating 956 a mapping data structure 330, configuring 814 a user interface, and many other operations discussed herein, are understood to be inherently digital. A human mind cannot interface directly with a CPU or other processor, or with RAM or other digital storage, to read and write the necessary data to perform the tool feature surfacing steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as analyzing, applying, attaching, communicating, configuring, conforming, creating, detecting, displaying, editing, employing, getting, increasing, mapping, noting, obtaining, offering, populating, providing, reading, receiving, recommending, reducing, replacing, running, setting, supplementing, utilizing (and analyzes, analyzed, applies, applied, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

List of Reference Numerals

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment

102 computer system, also referred to as a "computational system" or "computing system", and when in a network may be referred to as a "node"

104 users, e.g., user of an enhanced system 202

106 peripherals

108 network generally, including, e.g., LANs, WANs, software-defined networks, clouds, and other wired or wireless networks

110 processor

112 computer-readable storage medium, e.g., RAM, hard disks

114 removable configured computer-readable storage medium

116 instructions executable with processor; may be on removable storage media or in other memory (volatile or nonvolatile or both)

118 data

120 kernel(s), e.g., operating system(s), BIOS, UEFI, device drivers

122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, autocompletion software, simulators, fuzzers, repository access tools, version control tools, optimizers, collaboration tools, other software development tools and tool suites (including, e.g., integrated development environments), hardware development tools and tool suites, diagnostics, and so on

124 applications, e.g., word processors, web browsers, spreadsheets, games, email tools, commands

126 display screens, also referred to as "displays"

128 computing hardware not otherwise associated with a reference number 106, 108, 110, 112, 114

130 file, blob, table, container, or other digital storage unit(s)

132 digital document, e.g., word processor document, spreadsheet document, source code document, or other document in digital (computer-readable and software-editable) format; may include text, graphics, sound, etc.; may be stored in one or more files 130

134 cloud

202 system 102 enhanced with tool feature surfacing functionality 210

204 tool 122 or application 124 enhanced with tool feature surfacing functionality 210

206 transform provider, e.g., example-driven synthesizer of pattern match codes or of both pattern match codes and transforms 218; such a synthesizer may use Microsoft PROSE™ technology or another program synthesis technology to synthesize pattern match code, or text transforms, or both, that implement computational operations that produce the desired results (mark of Microsoft Corporation); transform provider may also or instead include a library 220; also referred to as "suggestion generator"

208 user interface generally; part of a tool 204

210 tool feature surfacing functionality, e.g., functionality which performs at least steps 808, 810, and 812, or an implementation providing functionality for any previously unknown method or previously unknown data structure shown in any Figure of the present disclosure

212 tool feature generally; may be implemented, e.g., as subtool 402, content display functionality 434; may be invoked, e.g., by a command 604, shortcut 610; includes any specific feature discussed herein and any other functionality accessible via user-tool interaction; may include a tutorial on how to use a capability (other feature) of a tool

214 recommendation from system to user for tool feature; also referred to as "suggestion" or "offering"; may refer to the content describing the recommendation or to a result described in that content; refers to a data structure

216 transform synthesizer

218 transform, e.g., a script, regex, subtool, or other computational mechanism which upon execution (also referred to as "actuation" or "application") automatically edits text or otherwise operates on content 404

220 library of automatable edit sequences; each library entry has a pattern matching portion (e.g., edit graph) and a transform portion (e.g., TEP 228)

222 automatable edit sequence, e.g., an entry in a library 220; depending on context, the pattern matching portion of an entry may also be referred to on its own as an automatable edit sequence, as may a sequence of edits 224 that match the pattern matching portion; also refers to edit sequence data structure

224 edit, e.g., version change in a document

226 target of operation by tool, e.g., documents are targets of editor operations, source code files and intermediate code files are frequent targets of debugger operations, build instruction files and source code files and resource files are frequent targets of compiler operations, and so on

228 temporal edit pattern data structure

300 tool feature surfacing software, e.g., software which performs any method according to any of the Figures herein or utilizes any data structure according to any of the Figures herein in a manner that facilitates better user-tool interaction under a metric 308

302 user-tool interaction, e.g., a user gesture 312 as received by a tool or a display 126 produced at least partially by a tool

304 pattern in current or previous user-tool interactions; digital data structure

306 interaction optimization, e.g., sequence of gestures utilizing a surfaced feature 212

308 user-tool interaction metric; computational

310 state change sought by user, e.g., as inferred by a system from one or more user gestures or other interaction context data 462; also referred to as a desired "result" or "state", or as an achieved result or state if effected in the system; represented by one or more digital values

312 user-tool interaction gesture, e.g., input 608 from a user interface 208, or input 608 from a peripheral 106 controlled directly or indirectly by a user, such as a keyboard, mouse, touch screen, touchpad, trackball, microphone, camera, accelerometer, or location sensor; user actions such as typing, speaking, moving in front of a camera, or gently shaking a device 202 are some examples of gestures 312

314 interface generally to a system 102 or portion thereof; may include, e.g., shells, graphical or other user interfaces, network addresses, APIs, network interface cards, ports

316 integrated development environments; includes software

318 repository tool, e.g., version control tool or archiving tool; includes software

320 source code (in digital form); an example of target content 404

322 source code editor; includes software

324 debugger; includes software

326 testing software; also referred to as a "test suite" since the presence of software to run the suite of tests is implicit

328 test, e.g., data or instructions or both for executing software that is under development in order to compare the execution results to results that are deemed correct

330 mapping data structure; digital

402 subtool; may be a tool in its own right, e.g., a repository commit tool may be a tool in its own right and also be integrated into an IDE as a subtool

404 target content, e.g., content of a file, blob, container, or other digital artifact upon which a tool feature can operate

406 location in a target; implicitly or explicitly identifies a relative or absolute position of at least one item of target content

408 count of the number of tools 122 utilized to achieve a result 310; digital value

410 count of the number of user-tool interaction gestures 312 utilized to achieve a result 310; digital value

412 speed measurement; digital value

414 security level; may be an explicit digital value or be implicit via absence or presence of security vulnerabilities

416 risk level; may be an explicit digital value or be implicit via absence or presence of identifiable risks

418 regular expression, also referred to as "regex"; an example of a transform 218

420 token; created by lexical analysis or other parsing; digital

422 parsing; also refers to a parser; parsing includes production of parser information, e.g., syntactic or semantic information in an abstract syntax tree or determined by a parser, including structural info (e.g., "this text is in the scope of a class declaration") or warnings or errors (e.g., "this variable has already been declared"), or both; performed by a parser, e.g., lexical analysis software, compiler, interpreter, lint tool, machine learning tool, or another tool that performs syntactic analysis or semantic analysis or both

424 security of source code, e.g., as opposed to security of a binary executable

426 risk of an omitted edit or other omitted operation

428 omitted edit, e.g., failure to treat one instance of a string or other syntactic or semantic item or subtree like other instances were treated

430 file containing source code

432 content including comments or uncommented source code or both

434 content display functionality; computational

436 debugger breakpoint; digital

438 run-to-the-cursor breakpoint; digital; execution of the program being debugged continues until a point indicated by a cursor placed by the user is reached, e.g., a particular statement or routine, then execution suspends

440 single-use breakpoint; digital; execution of the program being debugged continues until the single-use breakpoint is reached, then execution suspends and the single-use breakpoint is proactively removed 442 conditional breakpoint; digital; execution of the program being debugged continues until the conditional breakpoint is reached and a condition specified by the conditional breakpoint is satisfied, then execution suspends 444 set next statement; digital; execution of the program being debugged moves to a specified instruction without executing intervening code that would otherwise run (e.g., by changing an instruction pointer)

446 program execution exception; digital; may be built in such as divide-by-zero or may be developer-defined 448 exception control, e.g., whether an exception will be caught or ignored if thrown; may be referred to as exception enable or disable 450 process, in the computer science sense, not the legal sense 452 version control tree, e.g., in a source code or other file repository 454 repository branch 456 setting, e.g., value, of a configurable command or routine or other feature of a tool; may also be called a "preference" for some features 458 time interval 460 set of two or more interaction gestures 462 interaction context data; digital; e.g., interaction gestures and system state 502 white space, e.g., blank space, tab, newline, as represented digitally 504 unused code, e.g., source code whose removal from a project will not change the behavior of an executable built using that source code, e.g., code that will never be called or resources that never get loaded; an example is an instruction to import a library or namespace when none of the items defined in that library or namespace are subsequently used in the source code 506 comment content in source code; may be referred to simply as a "comment"; comments are text placed in a source code only for the benefit of human readers, as comments are ignored by interpreters and compilers 508 string, e.g., one or more adjacent characters; digital 510 code cleanup action, e.g., removal of unused code, reformatting to meet a convention for white space usage; performed computationally 512 cursor location or text insertion point; although a distinction may be made between them, for convenience they are grouped here under reference numeral 512; each may serve as user-tool interaction context data; for each, any change 310 is performed computationally; a text insertion point of a document in an editor is a location where typed or pasted text would be inserted; it may be indicated by a vertical bar |, or by some other visual indicator, or may be present without a visual indicator; in editors that recognize multiple input devices, such as a keyboard and a mouse, a distinction may be made between a text insertion point and a cursor location in that a cursor may be positioned by mouse movements without changing the text insertion point, and the text insertion point may change without moving the mouse cursor; sometimes a mouse operation, e.g., a double-click, may be used to change the text insertion point to match the mouse cursor location 602 user interface (UI) mechanism, e.g., diff view, window, menu, and so on 604 user commands (command from user to tool); actuating a transform is one kind of command 606 primary workflow, e.g., a sequence of interactions between a user and a system, with attendant metadata as to the current goal of the interaction and how that goal relates (or fails to relate) to other goals of a tool usage session; metadata may include, e.g., owner identification, timestamp, access settings or permissions, version control information 608 input received from a user or another source 610 shortcut, e.g., one or more keys that invoke a sequence of one or more programmed actions, with the understanding that the same sequence can also be performed using a larger number of keystrokes or other gestures; a macro invocation is an example; substituting keystrokes for navigation through menus may be done using a shortcut; shortcuts often use a command key, a control key, function keys, a shift case key, or other modifier keys; performed computationally; a macro may be viewed as a kind of shortcut 612 user interface window; displayable in a display 126; digital data structure 614 diff view in a user interface, e.g., a before-and-after display of source code illustrating the effect of performing a recommended transform, which shows the "before" version of the source in the same location it was in before the transform was recommended, and shows the "after" version next to the "before" version; a diff view may be with or without buttons 616 for performing actions 618 to accept, reject, or otherwise perform a user's indicated response to a recommendation; in a diff view, an available result of accepting the recommendation may be shown inline or in an adjacent line, and is visually distinguished by color, font, bold, italic, or otherwise 616 clickable or pressable or otherwise selectable button in a UI, may include a hyperlink 618 computational action performed in response to user selection 620 input device, e.g., keyboard, mouse, touch screen, microphone, camera, accelerometer, etc.

622 ambient visualization screen region (AVSR); also known as ambient visualization area or ambient display area; for a given time period, a screen area of height ten lines or less within which a user focused for more than half the time period (verifiable by eye tracking or user survey, for example) or in which an edit caret remained, or a mouse hover location remained 624 request or command to undo a prior computational action 626 visualizer software which enables a tool to display data in a meaningful way, e.g., by converting from binary to string or integer or other type, by showing graphs, by depicting hierarchy or nesting visually; computational 700 source of user-tool interaction context data 462

702 telemetry, e.g., user or system activity trace or other activity data; e.g., digital status updates from instrumentation in a tool or from profiling; as used herein, telemetry also includes log data, auditing data, security monitoring data, performance monitoring data, execution tracking data, and other data which is generally not the main purpose of a tool from a user's perspective but may assist in optimizing the tool or the user experience in a current or future version 704 process list, e.g., output from system utilities such as Windows® Task Manager, Linux® ps, or similar utilities in other operating system environments (marks of Microsoft Corporation, Linus Torvalds, respectively)

706 programming language service, e.g., a service which checks source code syntax or semantics; computational 708 interaction pattern match result, e.g., digital data indicating which regex or edit graph or temporal edit pattern matches a sequence of gestures 800 flowchart; 800 also refers to tool feature surfacing methods illustrated by or consistent with the FIG. 8 flowchart 802 computationally obtain interaction context data, e.g., using APIs, network transmissions, parsing 808 computationally detect an interaction pattern 304, e.g., using a regex 418 or context free grammar parsing 422 or synthesizer 216 pattern matching 810 computationally map a detected pattern 304 to an interaction optimization 306, e.g., in a hard-coded manner, or using a mapping data structure 330

812 computationally recommend an optimization, e.g., via a UI, an API, or as a transform or other suggestion 814 computationally configure a user interface display to show (or not show) certain content; "show" means visually show or make known by another human sense such as hearing or touch 816 computationally apply an interaction optimization 306, e.g., execute a tool feature shown in a suggestion 214

900 flowchart; 900 also refers to tool feature surfacing methods illustrated by or consistent with the FIG. 9 flowchart (which incorporates the steps of FIG. 8)

902 computationally avoid repeating a detected interaction pattern, e.g., when a suggestion 214 is accepted by a user and the detected pattern is supplemented 904 computationally repeat a detected interaction pattern, e.g., when a suggestion 214 is not accepted by a user 906 computationally replace an iteration of a detected interaction pattern by applying an interaction optimization instead, e.g., at subsequent locations 908 computationally execute a user-tool interaction gesture 910 computationally perform a desired (e.g., inferred) state change 912 computationally change target content 914 computationally display target content 916 computationally set a breakpoint or other debugger setting 918 computationally attach a debugger to a process, or attach a process to a debugger; attachment direction is interchangeable herein 920 computationally reduce a count of tools 122 utilized to achieve a particular result, relative to achieving the result without applying an optimization 306

922 computationally reduce a count of gestures 312 utilized to achieve a particular result, relative to achieving the result without applying an optimization 306

924 computationally reduce a risk incurred in achieving a particular result, relative to achieving the result without applying an optimization 306

926 computationally create a repository tree branch 928 computationally run a test of selected software 930 computationally increase security of achieving a particular result, relative to achieving the result without applying an optimization 306

932 computationally increase speed of achieving a particular result, relative to achieving the result without applying an optimization 306

934 computationally read a data structure 936 computationally stay within a workflow while achieving a particular result 938 computationally analyze input, e.g., by parsing tokenized input 940 computationally match input to a regex 942 computationally communicate with a synthesizer, e.g., by API, network transmission, shared memory 944 computationally note creation of a window or other process 946 computationally employ a TEP, e.g., for pattern detection 948 computationally perform an editing state change, e.g., in an editor 950 any step discussed in the present disclosure that has not been assigned some other reference numeral 952 computationally supplement part of an iteration of a detected interaction pattern by applying an interaction optimization 954 computationally utilize a tool 122, e.g., by executing the tool or utilizing a result of an execution of the tool 956 computationally populate at least part of a mapping structure 330

Conclusion

In short, the teachings herein provide a variety of tool feature surfacing functionalities 210 which operate in enhanced systems 202. Embodiments automate surfacing 800 of underutilized development tool features 212, thereby enhancing the discoverability of subtools 402, commands 604, shortcuts 610, settings 456, visualizers 626 and other content display functionalities 434, and other tool 122 features 212. A feature 212 is deemed underutilized by a given user 104 in a given situation if applying 816 the feature 212 would be better than not applying it according to at least one metric 308.

After spotting 808 an inefficiency in the user's interactions 302 with one or more tools 122, for example, or at other points, the feature surfacing functionality 210 offers 812 the user 104 an interaction optimization 306 suggestion 214. A mapping structure 330 correlates 810 detected 808 interaction patterns 304 with objectively 308 better interaction optimizations 306. Several examples of mappings 330 are discussed, illustrating various enhanced tools 204, various technical benefits, e.g., 920, 922, 924, 930, 932, various kinds of content, e.g., 404, 130, 132, 432, 502, 504, 506, 508, and other aspects of tool feature surfacing 900.

The user 104 can accept a suggestion 214, and have the suggested optimization 306 applied 816 by an enhanced tool 204. Accordingly, the tool 204 as enhanced by feature surfacing functionality 210 is able to reduce 922 the number 410 of user gestures 312 utilized 908 to accomplish a desired result 310, reduce 920 the number 408 of tools 122 utilized 954, increase 930 security 414, reduce 924 a risk 416 of error, or get 932 to the desired result 310 faster, for example. Interaction optimizations 306 also help the user 104 stay focused, by reducing 936 or avoiding 936 departures from the user's current primary workflow 606. Other aspects of tool feature surfacing functionality 210, and its technical advantages, are also described herein.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware in documents. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8, 9, 10, and 13 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured to improve tool feature discoverability, the computing system comprising:
   a digital memory; a processor in operable communication with the digital memory, the processor configured to perform tool feature surfacing steps including
   (a) detecting a user-tool interaction pattern within a digital representation of interactions between a user and one or more development tools, the detected interaction pattern including a set of user gestures which upon execution by the computing system perform at least a portion of a system state change indicated by the user gestures,
   (b) proactively and automatically mapping the detected interaction pattern to an interaction optimization which is applicable to perform the system state without requiring a repetition of the detected interaction pattern, and
   (c) configuring a user interface of the computing system with a suggestion offering the interaction optimization to at least partially replace or supplement the detected interaction pattern.

2. The computing system of claim 1, wherein the computing system is further characterized in at least one of the following ways:
   the computing system comprises an integrated development environment software development tool, and the optimization is applicable to reduce a count of other software development tools utilized to achieve the system state change;
   the computing system comprises a debugger development tool, and the optimization is applicable to reduce a count of user interaction gestures utilized to achieve the system state change;
   the computing system comprises a repository development tool, and the optimization is applicable to reduce a count of user interaction gestures utilized to achieve the system state change; or
   the computing system comprises a testing suite development tool, and the optimization is applicable to reduce a count of user interaction gestures utilized to achieve the system state change.

3. The computing system of claim 1, wherein the computing system is further characterized in at least one of the following ways:
   the computing system comprises a source code editor software development tool, and the optimization is applicable to reduce a count of user interaction gestures utilized to achieve the system state change;
   the computing system comprises a source code editor software development tool, and the optimization is applicable to increase the security of source code while achieving the system state change; or
   the computing system comprises a source code editor software development tool, and the optimization is applicable to reduce a risk of the user inadvertently omitting an edit while achieving the system state change.

4. The computing system of claim 1, wherein the optimization is applied to perform the system state change, and the computing system is further characterized in at least one of the following ways:
   the computing system comprises a source code editor software development tool and a source code file, and the system state change includes changing a content of the source code file;
   the computing system comprises a content display functionality of a development tool, and the system state change includes displaying a content by using the content display functionality;
   the computing system comprises a debugger as a software development tool and also comprises a source code file, and the system state change includes setting a debugger breakpoint in the source code file:
   the computing system comprises a debugger as a development tool, and the system state change includes attaching the debugger to a process;
   the computing system comprises a repository as a development tool, and the system state change includes creating a branch in a version control tree of the repository; or
   the computing system comprises a testing suite as a development tool, and the system state change includes running a test of the testing suite.

5. The computing system of claim 1, wherein the computing system comprises a mapping data structure residing in the memory, wherein mapping the detected interaction pattern to the interaction optimization includes reading the mapping data structure, and wherein the mapping data structure maps multiple interaction patterns to the same interaction optimization.

6. A method for improving tool feature discoverability, the method performed by a computing system, the method comprising:
   detecting a user-tool interaction pattern from a digital representation of interactions between a user and one or more development tools, the interaction pattern including a set of user gestures which upon execution by the computing system perform at least a portion of a system state change indicated by the user gestures;
   proactively and automatically mapping the interaction pattern to an interaction optimization which is applicable to perform the system state change;
   configuring a user interface of the computing system with a suggestion offering the interaction optimization; and
   performing the system state change by applying the offered optimization.

7. The method of claim 6, wherein the interactions between the user and one or more development tools have a primary workflow, and wherein applying the interaction optimization conforms more closely to the primary workflow than the detected user-tool interaction pattern.

8. The method of claim 6, wherein detecting the user-tool interaction pattern includes at least one of the following:
   analyzing keyboard input;
   matching user gestures to a regular expression;
   communicating with a transform synthesizer;
   noting creation or use of more than one user interface window; or
   employing a temporal edit pattern.

9. The method of claim 6, wherein an interval elapses after performing the system state change by applying the interaction optimization which was offered in the suggestion, wherein the method further comprises applying the interaction optimization again after the interval has elapsed and without any additional proactive suggestion from the computing system which offers the interaction optimization, and wherein the interval is characterized by at least one of the following:
   an interval duration of at least ten minutes; or
   entry of at least one hundred user gestures into the computing system during the interval.

10. The method of claim 6, wherein:
the computing system includes an editor as a development tool;
a set of user gestures which performed the system state change without applying the interaction optimization includes N user gestures;
the offered interaction optimization includes no more than N/2 user gestures and also performed the system state change;
the system state change includes at least one of the following:
reformatting white space, removing unused code, altering comment content,
applying a synthesized transform, replacing a string by another string, conducting a source code cleanup action, or repositioning a cursor in a file being edited.

11. The method of claim 6, wherein:
the computing system includes a target content operable on by at least one development tool;
a set of user gestures which performed the system state change without applying the interaction optimization operated on the target content at a first target location in the target content; and
the offered interaction optimization operated to perform the system state change in the target content in at least five additional target locations.

12. The method of claim 6, wherein detecting the user-tool interaction pattern, mapping the interaction pattern to the interaction optimization, and configuring the user interface of the computing system with the suggestion offering the interaction optimization each occur before the user interface receives a full set of user gestures which upon execution by the computing system would fully perform the system state change.

13. The method of claim 6, wherein configuring the user interface with the suggestion comprises suggesting to the user at least one of the following:
a development tool subtool which has not previously been used by the user in the computing system;
a development tool command which has not previously been used by the user in the computing system;
a development tool keyboard shortcut which has not previously been used by the user in the computing system; or
a development tool setting which has not previously been used by the user in the computing system.

14. The method of claim 6, wherein detecting a user-tool interaction pattern comprises obtaining interaction context data from at least one of the following:
a development tool user interface;
a development tool telemetry source;
a list of processes running on the computing system; or
a programming language service.

15. The method of claim 6, further characterized in at least one of the following ways:
performing the system state change by applying the offered interaction optimization performs the system state change with a reduction in a user interaction gesture count compared to a hypothetical alternative of utilizing the user-tool interaction pattern in place of the interaction optimization;
performing the system state change by applying the offered interaction optimization performs the system state change with a reduction in how many development tools are used compared to a hypothetical alternative of utilizing the user-tool interaction pattern in place of the interaction optimization;
performing the system state change by applying the offered interaction optimization performs the system state change with a reduction in context switches compared to a hypothetical alternative of utilizing the user-tool interaction pattern in place of the interaction optimization;
performing the system state change by applying the offered interaction optimization performs the system state change faster than a hypothetical alternative of utilizing the user-tool interaction pattern in place of the interaction optimization; or
performing the system state change by applying the offered interaction optimization performs the system state change with an increase in source code security compared to a hypothetical alternative of utilizing the user-tool interaction pattern in place of the interaction optimization.

16. A computer-readable storage device configured with data and instructions which upon execution by a processor cause a computing system to perform a tool feature discovery method, the method comprising:
detecting a user-tool interaction pattern from a digital representation of interactions between a user and one or more software development tools, the interaction pattern including a set of user gestures which upon execution by the computing system perform at least a portion of a system state change indicated by the user gestures;
proactively and automatically mapping the interaction pattern to an interaction optimization which is applicable to perform the system state change;
configuring a user interface of the computing system with a suggestion offering the interaction optimization; and
performing the system state change by applying the offered interaction optimization.

17. The computer-readable storage device of claim 16, wherein mapping the interaction pattern to the interaction optimization includes populating a mapping data structure using a pattern matching result of a code synthesis pattern matching algorithm.

18. The computer-readable storage device of claim 16, wherein the interaction optimization offered in the suggestion includes setting a conditional breakpoint.

19. The computer-readable storage device of claim 16, wherein the interaction optimization offered in the suggestion includes changing a content of a source code file.

20. The computer-readable storage device of claim 16, wherein the interaction optimization offered in the suggestion identifies a content display functionality.

* * * * *